Figure 1:
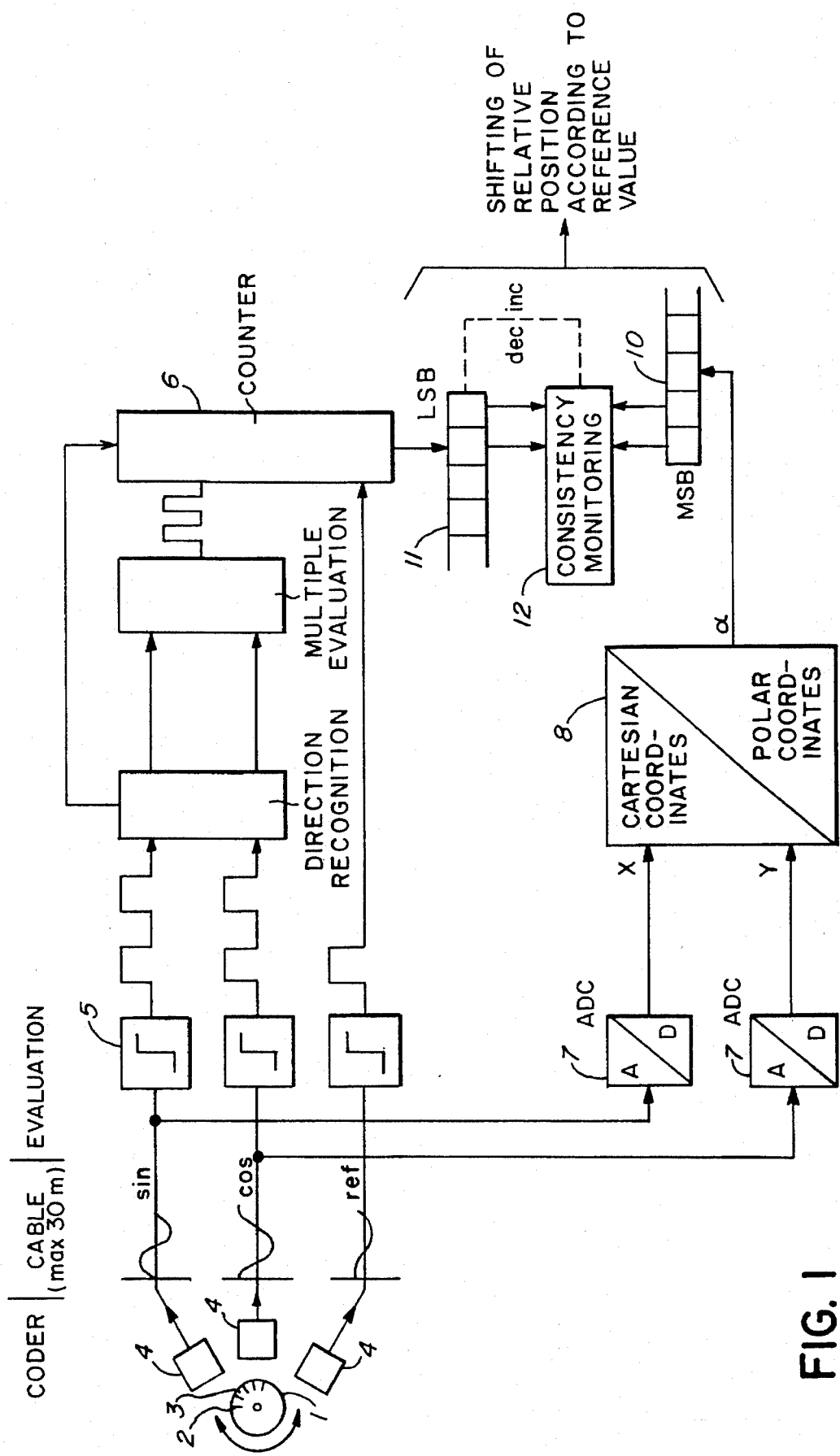

United States Patent [19]

Gotz

[11] Patent Number: 5,612,906
[45] Date of Patent: Mar. 18, 1997

[54] SYSTEM FOR THE MEASUREMENT OF THE ABSOLUTE POSITION OF THE MOVABLE CYCLIC DIVISION MARK CARRIER OF AN INCREMENTAL POSITION INDICATOR

[75] Inventor: Fritz R. Gotz, Oberasbach, Germany

[73] Assignee: Baumuller Nurnberg GmbH, Nurnberg, Germany

[21] Appl. No.: 304,764

[22] Filed: Sep. 12, 1994

[30] Foreign Application Priority Data

Sep. 14, 1993 [DE] Germany ............................ 43 31 151.2

[51] Int. Cl.⁶ ............................ G06F 17/00; H04M 1/64
[52] U.S. Cl. ............................ 364/571.01; 364/167.01
[58] Field of Search ............................ 364/167.01, 559, 364/560, 571.01, 571.02, 571.04; 73/1 E, 462, 579, 162; 324/207.11, 207.12, 207.17, 207.25, 207.26

[56] References Cited

U.S. PATENT DOCUMENTS

| | | | |
|---|---|---|---|
| 5,202,842 | 4/1993 | Suzuki | 364/571 |
| 5,463,393 | 10/1995 | Havlicsek | 341/115 |
| 5,485,407 | 1/1996 | Ishimoto et al. | 364/577 |

FOREIGN PATENT DOCUMENTS 4100666  5/1992  Germany.

OTHER PUBLICATIONS

R. Best, "Digital Signal Processing" (1992) pp. 497–503.

Primary Examiner—Edward R. Cosimano
Assistant Examiner—Edward Pipala
Attorney, Agent, or Firm—Wolf, Greenfield & Sacks, P.C.

[57] ABSTRACT

Process for the measurement of the absolute position of the movable, cyclic division mark carrier of an incremental position indicator or rotation indicator/resolver within and/or with regard to one of its divisional segments, periodically formed and/or delimited by the division marks on the carrier, with two scanning elements, stationarily arranged and addressing the division marks, which are positioned at such a distance from one another along the length or periphery of the segment that they deliver two sine- and cosine-like measurement signals which are evaluated on the basis of the arctangent function for position determination, by utilizing the values or components of a parameter vector identifying the measurement process, which is continuously redetermined during the measurement operation according to preset optimization criteria, for correction of the evaluation for disturbances and inaccuracies in the position indicator.

19 Claims, 3 Drawing Sheets

SYSTEM FOR THE MEASUREMENT OF THE ABSOLUTE POSITION OF THE MOVABLE CYCLIC DIVISION MARK CARRIER OF AN INCREMENTAL POSITION INDICATOR

The invention concerns a system, especially a process and/or a device, for the measurement of the absolute position of the movable, cyclical division mark carrier of an incremental position indicator within and/or with regard to one of its divisional segments, which are formed and/or delimited periodically by preferably equidistant division marks on the carrier, the measurement being effected by two scanning elements, stationary relative to the carrier and addressing the division marks, and separated by an interval corresponding to approximately one quarter of the length of a divisional segment, so that they generate by approximation two phase-shifted measurement signals, such as sine and cosine. The latter can then be evaluated with an arctangent function for position determination.

In the case of the known position indicators of the initially indicated type, mark divisions (distance from mark to mark) are scanned, which can be formed on a rotatable, rotationally symmetric or linear, longitudinally displaceable division mark carrier. The division can obviously be carried out by magnetic or nonmagnetic, optically transparent and nontransparent segments or by teeth and interdental spaces (on a gear or rack), which follow upon one another in alternating sequence. Obtained at the output of the corresponding scanning elements is a sequence of current or voltage pulses, whose number (increments) corresponds to a raw value for angular or lengthwise position.

Further known, to increase the resolution (compare Rolf-Dieter Klug, "Real-time Simulation of Mechanical Loading Systems for the Testing of Electrical Servo Drives", Dissertation in the Engineering Department of the University of Erlangen-Nürnberg, 1992, especially pages 99–131), is the calculation of the absolute position within a divisional segment (increment) by means of an arctangent function, after the sine and cosine functions of the measurement signals have been derived. The number of division marks or segments counted and the absolute position can then be combined per known mathematical equations.

In any event, the poor signal quality of the sine and cosine measurement signal of the known indicators operating according to the cyclic-absolute principle of measurement, attributable to fluctuations around the zero point of the amplitude ratio and in the mutual angular relationship, produces errors in measurement signal evaluation. This is traceable, for example, to a nonuniform, i.e. manufacturing tolerance-encumbered, distribution of the segments or periods over the length or periphery of the division mark carrier to small differences in the width of the marks on the optical (division-mark carrier) disk or to centering or movement errors of the mark carrier. For example, if a machine equipped with a generic position indicator gets hot, the result can be errors in signal evaluation or position determination. However, especially in presses and similar machinery, a precise control of positioning with high-resolution position indicators is indispensable.

An object of the invention is to achieve refined resolution, particularly of the absolute position between two divisional marks or within a marking segment, in the case of the initially cited measuring system with a divisional marking element which remains physically or structurally always the same. The solution proposed according to the invention, for a system with the initially indicated characteristics, is that the reading be corrected for the cited disturbances and inaccuracies in the position indicator by generating a parameter vector identifying the measurement process of the position indicator, whose values are used to correct the reading, the parameter vector being redetermined continuously throughout the measurement operation according to preset optimization criteria. Proposed as an alternative solution is a measuring device of the initially cited type with a computing system, containing an evaluation unit based on the arctangent function which receives the measurement signals, the computing system being provided with a filter and/or adaptation unit, connected on the input side, parallel to the evaluation unit, with the measurement signals and, on the output side, with the evaluation unit for the transmission of adaptive measurement signals generated according to an adaptation rule implemented in the adaptation unit independently of the measurement signals, the adaptive measurement signals in the evaluation unit being joined to the measurement signals according to a correction-computing rule.

In other words, the correction of the initially cited measurement errors is achieved by generating, via an adaptation law, a para- meter or adaptive measurement signal vector which is continuously adjusted during the course of the measurement operation. This vector is then utilized for correcting the evaluation of the sine- or cosine-like measurement signals. This correction is division-related (for example, relative to a tooth) and/or carried out relative to the division-carrier (for example, a gear) to correct especially divisional errors in the evaluation of the measurement signal.

According to a special development of the invented adaptive correction of the position indicator with sine/cosine measurement signal, the optimization criteria contain an adaptation rule which is structured in particular according to the method of least squares error and/or a gradient process, if necessary with sensitivity analysis; the parameter vector can thus be adjusted on line relative to the running measurement process, or adapted to the current measurement process, particularly the individual divisional segments. Optimizing procedures or algorithms, such as gradient methods, systematic searching methods or random searching methods, as well as the evaluation of the dynamic behavior or real systems by parameter sensitivity analyses are known in themselves (compare "Adaptive Rule Systems", Heinz Unbehauen, Study or Lecture at the University of Stuttgart, 1971/1975, especially pages 15–26).

Advantageously, a parametric, algorithmic model on the measurement process is created parallel to the running measurement operation and continuously updated on the basis of the corrected position values and/or of the parameter-adaptive measurement signal vector. Its initial values can then be compared for optimization with the measurement signals which can be read from the scanning units. Identification methods with adaptive models, particularly parallel comparison models with a structure as similar as possible to the system to be studied are known in themselves (compare Unbehauen, op. cit., particularly page 28ff). This is also true for the least squares error (compare Unbehauen, op. cit.).

In a special development of the parallel and parametric comparison model utilized per the invention, the complex function $$z = f(\alpha) \tag{1}$$

of a real variable $\alpha$ employed with $$z = x + j \cdot y \quad (2)$$

as the complex number, in which case $$j = \sqrt{-1} \quad (3)$$

The model equation can thus be applied $$Z_m = Z_0 + Z_c \cdot e^{j \cdot \alpha} + Z_d e^{-j \cdot \alpha} \quad (4)$$

(compare Bronstein-Semendyayef, *Handbook of Mathematics*, Verlag Harry Deutsch, 1973, pages 431–433). In the parameter form $$x = x(\alpha) \quad (5)$$
$$y = y(\alpha) \quad (6)$$

with $$Z_m = x_m + j y_m \quad (7)$$
$$Z_o = x_o + j y_o \quad (8)$$
$$Z_c = x_c + j y_c \quad (9)$$
$$Z_d = x_d + j y_d \quad (10)$$

and $$e^{j\alpha} = \cos \alpha + j \sin \alpha \quad (11)$$
$$e^{-j\alpha} = \cos \alpha - j \sin \alpha \quad (12)$$

(compare Bronstein, op. cit., pages 425 and 429) becomes via a few transformations $$\begin{aligned} x_m + j y_m &= \quad (13) \\ &= x_o + j y_o + (x_c + j y_c)(\cos\alpha + j\sin\alpha) + \\ &\quad (x_d + j y_d)(\cos\alpha - j\sin\alpha) \\ &= x_o + j y_o + x_c \cos\alpha + j y_c \cos\alpha + x_c j \sin\alpha - y_c \sin\alpha + \\ &\quad x_d \cos\alpha + j y_d \cos\alpha - x_d j \sin\alpha + y_d \sin\alpha \end{aligned}$$

$$x_m = x_o + x_c \cos\alpha - y_c \sin\alpha + x_d \cos\alpha + y_d \sin\alpha \quad (14)$$
$$j y_m = j(y_o + y_c \cos\alpha - y_c \sin\alpha + x_d \cos\alpha + y_d \sin\alpha) \quad (15)$$
$$x_m = x_o + (x_c + x_d)\cos\alpha - (y_c - y_d)\sin\alpha \quad (16)$$
$$y_m = y_o + (x_c - x_d)\sin\alpha + (y_c + y_d)\cos\alpha \quad (17)$$

With this method it is possible to identify or if necessary model the measurement process or the real measurement signals or at least their base waves via the mathematical definition of an ellipse or, in the special case, of a circle, or to set up the correspondingly optimized parameter vector.

The comparison model is thus based, according to an especially advantageous development of the invention, on a general ellipse which can lie anywhere relative to the coordinate cross in the Cartesian coordinate system and is described by model equations or the corresponding parameter set. The adaptation of the parameter set corresponding to each divisional mark or each division segment can, in the invented measurement system, be expediently operated in the computer system as a background process at low speed. To set it up or initialize it, the number of divisional marks or division per length or angle unit are given to the computer system.

The invention is not restricted to use with incremental position indicators. Known rotation indicators/resolvers can be effectively substituted for it: For the resolver possesses in both the stator and rotor in each case two windings displaced by 90° as scanning elements, so that two sine- and cosine-like starting signals result, which depend upon the angular position of the rotor as the divisional marks carrier. In the practical application with the initially cited measurement signal evaluation (compare R. D. Klug, op. cit.), the carrier frequency of the resolver is still to be eliminated.

Figure 2:
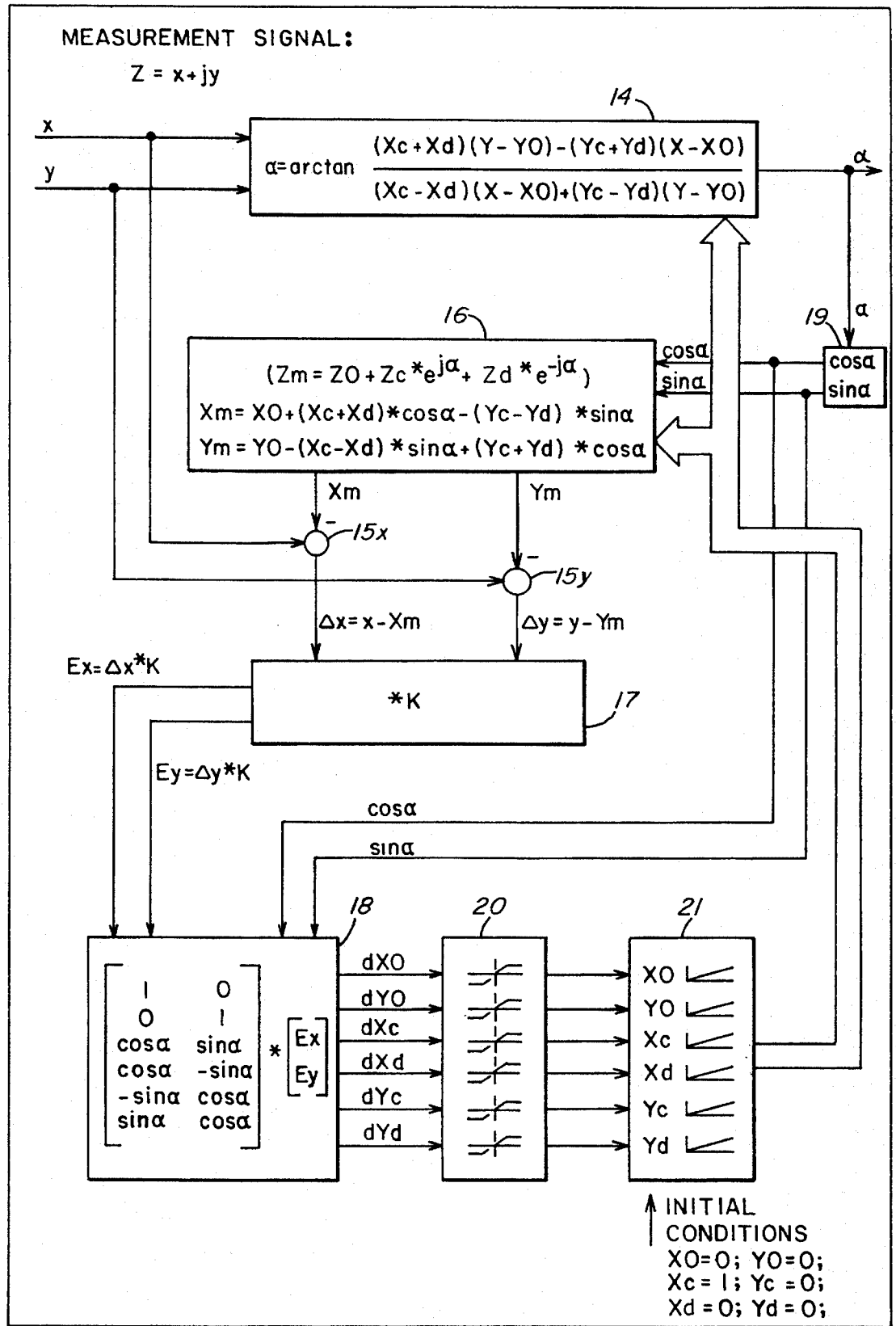
Figure 3:
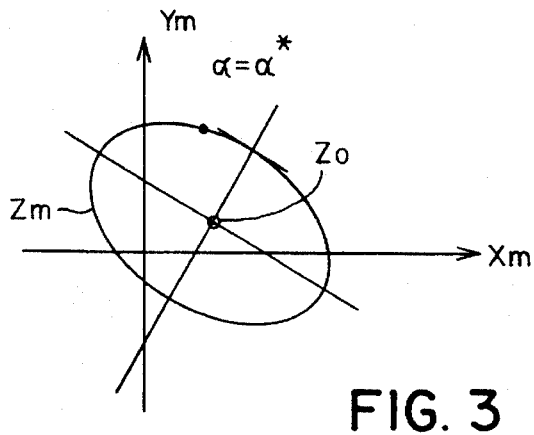
Figure 4:
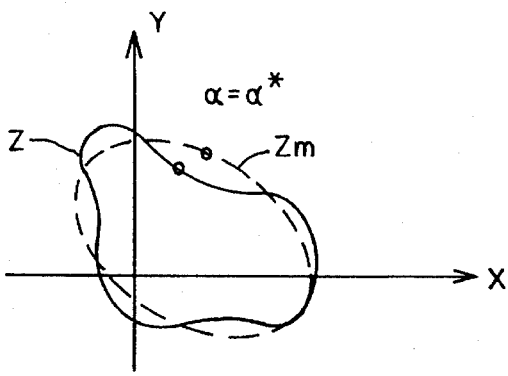
Figure 5:
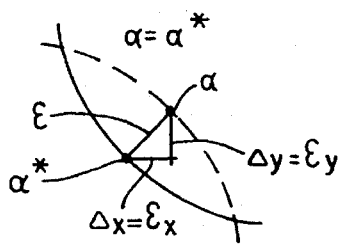

Additional details, characteristics and advantages of the invention issue from the subclaims, from the following description of a preferred execution example of the invention as well as with reference to the drawings. The latter show in:

FIG. 1 a block diagram of an arrangement for angle calculation with a device according to the invention;

FIG. 2 a mathematical circuit diagram for the invented process and the device according to the invention;

FIG. 3 and 4 bent curves, modeled in part according to the invention, in the Cartesian coordinate system;

FIG. 5 a section from FIG. 4 on an enlarged scale; and

Figure 6:
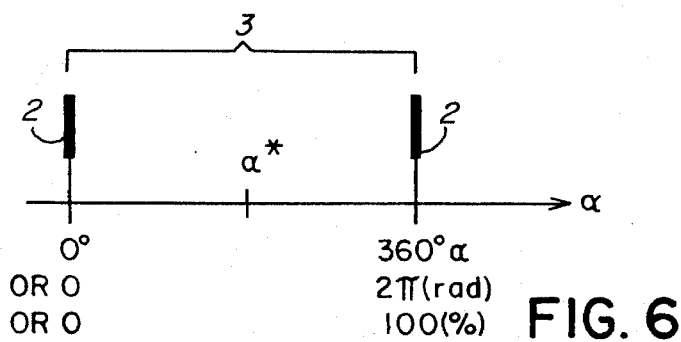

FIG. 6 the absolute position in a divisional segment.

According to FIG. 1, a disk 1, mounted on a shaft (not shown) with which it rotates, is caused to rotate. On its periphery it exhibits divisional marks 2, each delimiting a divisional segment 3. These move, due to the rotation of the disk 1, past scanning heads 4 which operate, for example, by optical means. The interval between the latter being approximately one quarter that between two divisional marks on the disk or division mark carrier 1, sin/cos signals will result at their outputs, which will stand in sine/cosine phase relationship to one another according to the accuracy of the divisions on the division mark carrier 1 and/or the distance of the scanning heads 4 from one another. A pulse-forming stage 5 converts these signals into corresponding square-wave pulses, so that they can undergo further digital processing, especially counting in a counter element 6.

An analog/digital converter (ADC) stage 7 converts the two sine- and cosine-like measurement signals respectively into a binary value x, y, which can be processed per equation (2) above as complex numbers and/or ellipse coordinates relative to a Cartesian coordinate system. These (digitized) measurement signals x, y are passed to a measurement and evaluation unit 8, according to the invention, which corrects a real absolute position value a* relative to the two divisional marks 2 of a division segment 3 (compare FIG. 6) into an absolute position value α, adaptively cleansed of disturbances and inaccuracies. The latter is then combined with the result of the division mark counter 6, which incremented its counter state according to the division marks that appeared during rotation, into the overall absolute position value. Provided for this purpose is a microprocessor 9, with two registers 10, 11 and a component 12 for monitoring consistency. This controls the consistent or positionally correct combination of the binary value representing the absolute value α in the first register 10 with the binary value representing counted divisional segments or division marks in the second register 11.

The measurement and evaluation device 8 is provided, according to FIG. 2, with a computing system 13 which includes an evaluation unit 14 for the measurement signals x, y, operating on the basis of the arctangent. At the output, the evaluation unit 14 generates the corrected absolute position signal (or a corresponding binary value) α. The measurement signals are each compared further in the computing system 13 at two summation or comparison sites 15x, 15y with an output value Xm, Ym of a comparison model 16, or the model values are subtracted from them. The deviations x, y thereby resulting are processed further into error values Ex, Ey in an amplifier stage 17 by multiplying them with the constant K.

The computing system 13 includes moreover an optimization computing module 18 which receives the error signals Ex, Ey. Also passed to this module 18 are the outputs of a sine and cosine function generator 19 which calculates the sine and cosine of the absolute position function α on receiving it. Implemented in the optimization module 18 are sensitivity functions in the form of a matrix multiplication with the error vectors Ex, Ey, which realizes an adaptation law according to the gradient process and the method of the least squares error (compare Unbehauen, op. cit.) in conjunction with the difference formation 15x, 15y. A differential parameter vector dX0, dY0, dXc, dXd, dYc, dYd then appears at the output of the optimization module 18. This is fed to a delimiter stage 20 which delimits the differential input signals. Following delimitation, there is an integration of the differential parameter signals dX0–dY0 in the integrating stage 21. If a digital computer with numeric methods of calculation is employed instead of an analog computer, the output signals dX0 ... dY0 of the optimization module 18 will then represent the difference signals which are summed in a similarly operating summation stage 21. At the output of this integrating or summing stage 21 is then the adapted parameter vector or set X0, Y0, Xc, Xd, Yc, Yd, which is passed respectively to both the evaluation unit 14 as well as to the comparison model 16 as input parameters. Also passed directly to the comparison model 16 are the outputs of the sine and cosine function generator 19 with the corresponding function values of the sine and cosine of the corrected absolute position α. The comparison model 16 processes the parameter vector or set X0 ... Y0 as well as the sine and cosine of the corrected absolute position α corresponding to equation (16) above (real part) and (17) (imaginary part). Real and imaginary part $X_m$, $Y_m$ are then fed to the respective comparison sites 15X, 15Y with negative signs. The process of calculation for comparison model 16 is then able to run in the computer system as a relatively slow, background process. Used for rapid "on-line" calculation of the corrected absolute position value α are:

$$x = x_o + (x_c + x_d)\cos\alpha - (Y_c - Y_d)\sin\alpha \tag{18}$$

$$y = y_o + (x_c - x_d)\sin\alpha - (Y_c + Y_d)\cos\alpha \tag{19}$$

from which $$(x_c + x_d)\cos\alpha - (y_c - y_d)\sin\alpha = x - x_o \tag{20}$$

$$(y_c + y_d)\cos\alpha + (x_c - x_d)\sin\alpha = y - y_o \tag{21}$$

arise after transformation.

This system of linear equations for the two unknown cosines s and sines s results, after known methods of resolution (compare Bron- stein, op. cit., page 127), in:

$$\cos\alpha = \frac{D_1}{D} \tag{22}$$

$$\sin\alpha = \frac{D_2}{D} \tag{23}$$

or immediately $$\tan\alpha = \frac{\sin\alpha}{\cos\alpha} = \frac{D_2}{D_1} \tag{24}$$

The determinants are therefore:

$$D_2 = (x_c + x_d)(y - y_o) - (y_c - y_d)(x - x_0) \tag{25}$$

$$D_1 = (x_c - x_d)(x - x_o) + (y_c - y_d)(y - y_o) \tag{26}$$

The result is the variable sought for, in the format corrected as follows:

$$\alpha = \arctan\frac{(x_c + x_d)(y - y_o) - (y_c - y_d)(x - x_o)}{(x_c - x_d)(x - x_o) + (y_c - y_d)(y - y_o)} \tag{27}$$

Let the following yet be stated relative to the method of operation of the invented measurement and evaluation system:

The paired measurement signal values X, Y (digitized if necessary-with the use of a digital computer instead of an analog computer) determine the absolute position within a division segment 3, between two divisional marks 2, which is present as an imprecise or disturbed absolute position signal a*. The divisional segment 3 thereby forms a period or a cycle. The goal is now to produce a fine subdivision between the two division marks 2 for the purpose of higher resolution, without the need for recourse to the application of a fine subdivision between the division marks 2.

With the measurement signal pair X, Y supplied by the two scanning heads 4, it is possible in particular to represent closed curves in mathematically complex form (compare Bronstein, op. cit., pages 432 and 433). In reality, the absolute value α*, encumbered with disturbances and inaccuracies and distributed between the two division marks 2, could be represented per the irregularly bent curve Z (continuous line) in FIG. 4. The following disturbances or inaccuracies are contained in this irregularly bent curve Z: displacement from the coordinate origin or zero point of the Cartesian coordinate system, which can for example be based on an electrical offset; distortion of the circle present in the ideal case by fluctuating amplitude relationships of the measurement signals from the two scanning heads 4; deviations and disturbances in the mutual angular and phase relationships of the two measurement signals X, Y from the scanning heads, which leads to a rotation of the ellipse or its axes relative to the coordinate cross. These measurement distortions occur mostly in combination.

The strategy now includes interpreting the measurement signal Z in the comparison model 16 in such a way that the cited distortions due to the disturbing influences and inaccuracies indicated above reduce to an arbitrary ellipse on the Cartesian coordinate cross, if necessary rotated and displaced. This is shown in FIG. 3, according to which the comparison model output $Z_m$ describes such an ellipse. If the measurement were ideal, this ellipse would be reduced to a circle with a radius=1, whose center lies on the coordinate origin (unit circle). According to the invention, the generally positioned ellipse, describable in complex form, $Z_m$ is sought, which best corresponds to the measurement signal Z according to equation (2) above. This is illustrated in FIG. 4 by superposition of the model curve $Z_m$ of the curve Z actually measured. According to FIG. 5, the method of the smallest least squares error (quality functional—compare Unbe—hauen, op. cit.) is utilized as the criterion for the model curve $Z_m$ best corresponding to the actual measurement Z. Accordingly, the quality functional $$\epsilon^2 = \epsilon^2 x + \epsilon^2 y = Min \qquad (28)$$

(compare FIG. 5) should be as small as possible, which corresponds to the model ellipse $Z_m$ lying closest to the irregularly bent curve Z. Required for this is an optical accommodation or a continuous adjustment of the comparison model 16 (compare FIG. 2). This is achieved by means of the optimizing calculation module 18 which forms partial derivatives relative to the changes in the measurement process parameters via sensitivity functions. The parameter set $x_o \ldots y_d$ arising after integration 21 then serves, on the one hand, for the updating of the comparison model 16. On the other hand, the generally positioned ellipse $Z_m$ per FIG. 3 is transformed into an origin circle by the correction-calculation rule of the evaluation unit 14, per the arctangent function. Ellipse-transformation equations are essentially known (compare Bronstein, op. cit., pages 182, 183). Parameters $x_o$ and $y_o$ represent, in the execution example, the parallel or zero-point displacement. The remaining parameters $x_c \ldots y_d$ serve for representation of the ellipse and are in the ideal case or at the very beginning to be set equal to zero, with the exception of $X_c$ (compare the initial conditions in FIG. 2, where $X_c=1$ symbolizes the radius of the ideal origin circle).

The absolute position signal $\alpha$, thus corrected, then forms a highly accurate, highly current measurement signal which can for example be used as a storage rule system in direct-drive press machinery. A multiplication of divisions is thereby produced at the same time, without the number of division marks being increased. That is to say, the absolute position signal $\alpha$, as the real variable of a complex function $Z(\alpha)$, subdivides the elliptical curve or the divisional segment 3 between the two division marks 2.

What is claimed is:

1. Process for measurement of an absolute position of a movable cyclic division mark carrier of an incremental position indicator with regard to one of its divisional segments periodically formed by division marks on the carrier, with two scanning elements, stationarily arranged and addressing the division marks, positioned at such a distance from one another along a length of the segment that they deliver sine and cosine-like measurement signals, respectively, which are evaluated according to an arctangent function for position determination, the measurement process comprises, for correction of the evaluation relative to disturbances and inaccuracies in the position indicator, components of a parameter vector identifying the measurement process on the basis of a mathematical model are used in the arctangent function, said mathematical model including a form of at least one function of the determined absolute position of time division mark carrier and the at least one function is computed in parallel to the running measurement process and is continuously updated, and thereby computed function values of of the model are compared with measurement signals from the scanning elements and processed by an adaption rule so as to adjust the parameter vector relative to the current measuring process by optimization of a predetermined criteria.

2. Process according to claim 1, wherein the predetermined optimization criteria comprises an adaptation rule operating according to at least one of a method of a least squares error and a method of a gradient process, by which means the parameter vector is continuously adjusted relative to the current measuring process.

3. Process according to claim 2, wherein comparison results, together with the at least one corrected position element, are utilized as input values for the adaptation rule.

4. Process according to claim 2, wherein the adaptation rule operates with a sensitivity analysis.

5. Process according to claim 2, wherein comparison results together with the at least one corrected position element are utilized as input values for the adaptation rule.

6. Process according to claim 1, wherein for at least one of identification and modeling of the measurement process, and modeling of the measurement signals, the optimized parameter vector is used, which is structured for the mathematical definition of at least one of an ellipse and a circle.

7. Process according to claim 6, wherein the measurement signals are mathematically linked with the parameter vector, for correction of their evaluation during position determination.

8. Process according to claim 7, wherein a system of equations is formed from components of the parameter vector, and from values corresponding to the measurement signals, for a determination of the sine and cosine of the absolute position, the value for the absolute position being calculated from the sine and cosine of the absolute position by means of the arctangent function.

9. Process according to claim 6, wherein, for correction of the measurement signal evaluation, at lease one of a displacement of a Cartesian coordinate origin in a curve center of an ellipse, and a rotation of Cartesian coordinate cross corresponding to intersecting axes of the ellipse, and an adjustment of the axes of the ellipse relative to one another, are carried out for formation of a circle via at least one of mathematical transformation and combination of ellipse parameters with the measurement signals.

10. Device for measurement of an absolute position of a movable cyclic division mark carrier of an incremental position indicator with regard to one of its divisional segments periodically formed by division marks on the carrier, with two scanning elements, stationarily arranged and addressing the division marks, positioned at such a distance from one another along a length of the segment that they deliver sine and cosine-like measurement signals, respectively, with a computing system including an evaluation unit which receives the measurement signals, and in which these measurement signals are adjusted according to an arctangent function for determination of the absolute position, wherein the computing system includes an adaptation unit, connected on an input side, parallel to the evaluation unit, with the measurement signals and with an absolute position signal determined by the evaluation unit and, on an output side, with the evaluation unit, for transmission of adaptive measurement signals which are generated according to an adaptation rule implemented in the adaptation unit independently of the measurement signals, and that the adaptive measurement signals are combined with the measurement signals in the evaluation unit, according to a correction-calculating rule.

11. Device according to claim 10, wherein a parametric comparison model is implemented in the adaptation unit, which is connected on the input side with the output of the evaluation unit and the adaptive measurement signals for adjustment of its parameters and configured in order to model the position-measuring process computationally, independently of a corrected absolute position signal.

12. Device according to claim 11, further comprising a comparator stage which is connected with the output of the comparison model, and with the output of the position indicator, for the formation of difference signals.

13. Device according to claim 12, wherein the comparator stage is connected downstream of an amplifier stage.

14. Device according to claim 13, wherein the adaptation unit includes an optimization computing module which is connected on the input side with at least one of: the input measurement signals and the corrected absolute position signal and, on the output side, with the evaluation unit, and that an optimization rule is implemented in the adaptation unit.

15. Device according to claim 14, wherein the optimization computing module is connected on the input side with at least one of the output of the comparator and the amplifier stage.

16. Device according to claim 15, wherein at least one of a gradient process and at least one sensitivity function are implemented in the optimization computing module as the optimization computing rule, so that at least one difference signals are present at an output of the optimization computing module, and that the latter are integrated with the adaptive measurement signals for at least one of the evaluation unit, and the comparison model, in a summing stage attached downstream and connected to the evaluation unit.

17. Device according to claim 16, further comprising a low-pass stage which is connected between the optimization computing module and the summing stage.

18. Device according to claim 10, further comprising a division mark counter having an output connected to the output of the evaluation unit via a microprocessor for formation of the overall absolute position.

19. Device according to claim 18, wherein the microprocessor includes a summing element for summing the corrected absolute position from the evaluation unit and the counter result from the division mark counter and a dividing element, attached downstream and set to the division mark total, which is connected to one output of the evaluation unit, and of the division mark counter, and configured for at least one of the consistent combination of values, especially binary numbers, and a consistency control.

* * * * *